(12) United States Patent
Bae (10) Patent No.: US 11,437,046 B2
(45) Date of Patent: Sep. 6, 2022

(54) ELECTRONIC APPARATUS, CONTROLLING METHOD OF ELECTRONIC APPARATUS AND COMPUTER READABLE MEDIUM

(71) Applicant: Samsung Electronics Co., Ltd., Suwon-si (KR)

(72) Inventor: Jaehyun Bae, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 286 days.

(21) Appl. No.: 16/591,004

(22) Filed: Oct. 2, 2019

(65) Prior Publication Data

US 2020/0118572 A1 Apr. 16, 2020

(30) Foreign Application Priority Data

Oct. 12, 2018 (KR) ........................ 10-2018-0121505

(51) Int. Cl.
| | |
|---|---|
| G10L 17/00 | (2013.01) |
| G10L 17/08 | (2013.01) |
| G10L 17/24 | (2013.01) |
| G06F 21/32 | (2013.01) |
| G10L 17/04 | (2013.01) |
| G10L 17/14 | (2013.01) |
| G10L 17/02 | (2013.01) |

(52) U.S. Cl.
CPC .............. *G10L 17/24* (2013.01); *G06F 21/32* (2013.01); *G10L 17/00* (2013.01); *G10L 17/02* (2013.01); *G10L 17/04* (2013.01); *G10L 17/14* (2013.01)

(58) Field of Classification Search
CPC ......... G10L 17/24; G10L 17/00; G10L 17/04; G10L 2015/088; G10L 17/06; G10L 17/14; G10L 15/22; G10L 2015/223; G10L 2015/225; G10L 2025/783; G10L 15/063; G10L 15/10
See application file for complete search history.

(56) References Cited

U.S. PATENT DOCUMENTS

| | | | |
|---|---|---|---|
| 6,094,632 A | 7/2000 | Hattori | |
| 6,246,987 B1 * | 6/2001 | Fisher | H04M 3/42204 704/247 |

(Continued)

FOREIGN PATENT DOCUMENTS

| | | |
|---|---|---|
| JP | 2991144 B2 | 12/1999 |
| JP | 2001-309080 A | 11/2001 |

(Continued)

*Primary Examiner* — Olujimi A Adesanya
(74) *Attorney, Agent, or Firm* — Staas & Halsey LLP (57) ABSTRACT

An electronic apparatus and a method thereof are provided. The electronic apparatus according to an embodiment includes a memory to store a speaker model including characteristic information of a voice of a user corresponding to a specific word, and a processor configured to, based on a first input voice corresponding to the specific word, provide a voice recognition service through the electronic apparatus based on a first authentication performed based on data on the first input voice and the speaker model, and perform a second authentication based on data corresponding to the specific word among data of the second input voice that is input while the voice recognition service is provided and the speaker model.

13 Claims, 7 Drawing Sheets

(56) References Cited

U.S. PATENT DOCUMENTS

| | | | | |
|---|---|---|---|---|
| 6,393,397 | B1* | 5/2002 | Choi | G10L 17/04 |
| | | | | 704/238 |
| 6,401,063 | B1* | 6/2002 | Hebert | G10L 17/04 |
| | | | | 704/E17.006 |
| 6,480,825 | B1* | 11/2002 | Sharma | G10L 17/26 |
| | | | | 704/270 |
| 8,060,366 | B1* | 11/2011 | Maganti | H04L 12/1827 |
| | | | | 704/246 |
| 8,311,826 | B2 | 11/2012 | Rajakumar | |
| 8,332,223 | B2* | 12/2012 | Farrell | G10L 17/24 |
| | | | | 704/246 |
| 8,694,315 | B1* | 4/2014 | Sheets | G06Q 20/4014 |
| | | | | 704/246 |
| 9,502,038 | B2 | 11/2016 | Wang et al. | |
| 9,697,836 | B1* | 7/2017 | Lousky | H04L 63/0861 |
| 9,721,571 | B2* | 8/2017 | Lousky | G10L 17/04 |
| 10,255,922 | B1* | 4/2019 | Sharifi | G10L 15/22 |
| 10,923,130 | B2* | 2/2021 | Choi | H04L 63/083 |
| 2007/0038460 | A1* | 2/2007 | Navratil | G10L 17/20 |
| | | | | 704/E17.007 |
| 2008/0082331 | A1* | 4/2008 | Luan | G10L 17/04 |
| | | | | 704/E17.001 |
| 2010/0131273 | A1* | 5/2010 | Aley-Raz | G10L 17/04 |
| | | | | 704/247 |
| 2011/0145000 | A1* | 6/2011 | Hoepken | G10L 15/22 |
| | | | | 704/275 |
| 2011/0224986 | A1* | 9/2011 | Summerfield | G10L 17/12 |
| | | | | 704/246 |
| 2013/0325473 | A1* | 12/2013 | Larcher | G10L 17/10 |
| | | | | 704/249 |
| 2014/0007210 | A1* | 1/2014 | Murakami | G06F 40/50 |
| | | | | 726/7 |
| 2014/0330563 | A1* | 11/2014 | Faians | G10L 17/22 |
| | | | | 704/236 |
| 2015/0261944 | A1* | 9/2015 | Hosom | G06F 21/32 |
| | | | | 726/19 |
| 2015/0302856 | A1* | 10/2015 | Kim | G10L 25/48 |
| | | | | 704/273 |
| 2015/0371639 | A1* | 12/2015 | Foerster | G10L 17/06 |
| | | | | 704/233 |
| 2016/0314792 | A1* | 10/2016 | Alvarez Guevara | G10L 15/18 |
| 2017/0256270 | A1* | 9/2017 | Singaraju | G10L 25/21 |
| 2018/0018973 | A1* | 1/2018 | Moreno | G10L 17/02 |
| 2018/0158462 | A1 | 6/2018 | Page et al. | |

FOREIGN PATENT DOCUMENTS

| | | |
|---|---|---|
| KR | 10-0673834 B1 | 1/2007 |
| KR | 10-1181060 B1 | 9/2012 |

\* cited by examiner

ELECTRONIC APPARATUS, CONTROLLING METHOD OF ELECTRONIC APPARATUS AND COMPUTER READABLE MEDIUM

CROSS-REFERENCE TO RELATED APPLICATIONS

This application is based on and claims priority under 35 U.S.C. § 119 from Korean Patent Application No. 10-2018-0121505, filed on Oct. 12, 2018, in the Korean Intellectual Property Office, the disclosure of which is incorporated herein by reference in its entirety.

BACKGROUND

1. Field

Devices and methods consistent with what is disclosed herein relate to an electronic apparatus and a controlling method thereof, and more particularly, to an electronic apparatus for providing a voice recognition service after performing authentication by recognizing a user voice for fixed vocabulary, and performing additional authentication based on a voice input while a voice recognition service is provided and a controlling method thereof.

2. Description of the Related Art

Speaker authentication is a technology for identifying whether or not an input voice is a speaker's own voice to be authenticated.

The speaker authentication is categorized into a fixed vocabulary speaker authentication for guiding a user to utter a predetermined word or sentence and analyzing/authenticating the uttered word/sentence, and a free utterance speaker authentication for guiding a user to utter a random word or sentence and analyzing/authenticating the uttered word/sentence.

The fixed vocabulary speaker authentication targets a predetermined specific word or sentence, and thus it has an advantage in that a speaker model on a specific word/sentence can be simply generated once a user of an electronic apparatus utters fixed vocabulary several times.

However, there is a downside in the fixed vocabulary speaker authentication because a personator, not a proper user of an electronic apparatus may record or mimic only a specific word/sentence to succeed in the speaker authentication.

Figure 1:
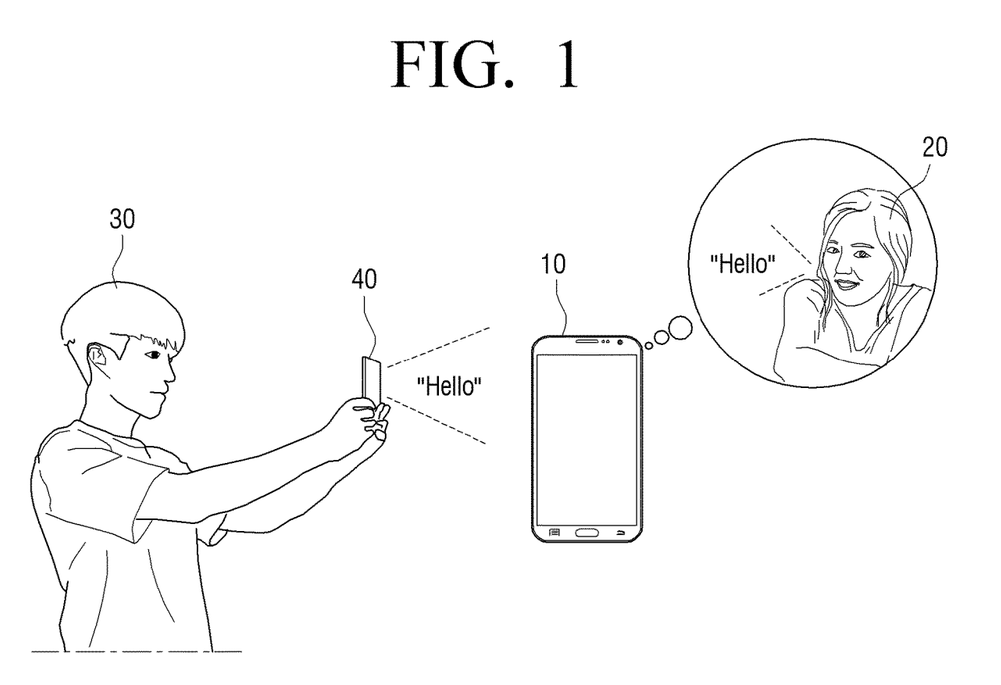
FIG. 1 is a view to explain a problem of a conventional technology for providing a voice recognition service after performing speaker authentication based on fixed vocabulary.

FIG. 1 is a view to explain a problem of a conventional technology for providing a voice recognition service after performing speaker authentication based on fixed vocabulary.

A mobile phone 10 of FIG. 1 may be preset to provide a voice recognition service by identifying the user 20 as being authenticated when a voice "Hello" of a user 20 is input.

FIG. 1 assumes a situation where a personator 30 records the voice "Hello" uttered by the user 20, and inputs the voice into the electronic apparatus 10.

Referring to FIG. 1, the mobile phone 10 may identify as if the user 20 utters "Hello". Therefore, it is promising that the speaker authentication is successful, and the user 30 may use the voice recognition service of the mobile phone 10 without any problem.

Meanwhile, the free utterance speaker authentication has an advantage in that a personator ends up failing in authentication by recording or mimicking only few word/sentences of the user given a relatively large amount of voices to be authenticated compared to the fixed vocabulary speaker authentication, but also has a disadvantage in that there are too many utterances required to the user of the electronic apparatus in generating a speaker model.

SUMMARY

An aspect of the embodiments relates to providing an electronic apparatus with improved security for speaker authentication by performing additional speaker authentication based on a voice input while a voice recognition service is used even after the fixed vocabulary speaker authentication has confirmed, and the voice recognition service is provided, and a controlling method thereof.

Another aspect of the embodiments relates to providing an efficient electronic apparatus without a separate process of establishing a speaker model by using a speaker model same as that of fixed vocabulary speaker authentication despite additional speaker authentication performed while using a voice recognition service and a controlling method thereof.

Another aspect of the embodiments relates to an electronic apparatus for updating a personator model based on a voice that fails in at least one speaker authentication, and using the personator model for speaker authentication and a controlling method thereof.

According to an embodiment, there is provided an electronic apparatus, including a memory configured to store a speaker model including characteristic information of a voice of a user corresponding to a specific word, and a processor configured to, based on a first input voice corresponding to the specific word, provide a voice recognition service through the electronic apparatus based on a first authentication performed based on data of the first input voice and the speaker model, and perform a second authentication based on data corresponding to the specific word among data of a second input voice that is input while the voice recognition service is provided and the speaker model.

The processor may be further configured to perform the second authentication by comparing the data corresponding to the specific word among the data of the second input voice that is input while the voice recognition service is provided with the speaker model and a personator model stored in the memory, wherein the personator model includes characteristic information of a voice different from the voice of the user.

The processor may be further configured to obtain a phoneme matching at least one of a plurality of phonemes constituting the specific word among phonemes corresponding to the second input voice that input while the voice recognition service is provided, determine a first similarity between characteristic information of the first input voice corresponding to the obtained phoneme and characteristic information of the speaker model, and perform the second authentication based on the determined first similarity.

The processor may be further configured to determine a second similarity between the characteristic information of the first input voice corresponding to the obtained phoneme and characteristic information of a personator model stored in the memory, and perform the second authentication based on the determined first similarity and the determined second similarity, wherein the personator model includes characteristic information of a voice different from the voice of the user.

The processor may be further configured to, based on a ratio of the determined first similarity to the determined second similarity being greater than a first threshold value, determine that the second authentication is successful, and based on the ratio of the determined first similarity to the determined second similarity being equal to or smaller than a first threshold value, determine that the second authentication is failed.

The processor may be further configured to, based on determination that the second authentication is failed, update the personator model based on characteristic information of at least one of the first input voice that succeeds in the first authentication and the second input voice that is input while the voice recognition service is provided.

The processor may be further configured to, based on determination that the second authentication is failed, terminate the voice recognition service.

The processor may be further configured to, based on the second authentication being successful, continue the providing of the voice recognition service, and perform the second authentication again based on data of additional voice that is input after the second authentication is successful.

The processor may be further configured to, based on a previous voice input before the voice recognition service is provided corresponding to the specific word, compare the data of the first input voice with the speaker model and a personator model pre-stored in the memory to perform the first authentication, wherein the personator model includes characteristic information of a voice different from the voice of the user.

According to an embodiment, there is provided a method for controlling an electronic apparatus, the method including, based on a first input voice corresponding to a specific word, performing a first authentication based on data of the first input voice and a pre-stored speaker model including characteristic information of a voice of a user corresponding to the specific word, based on the performed first authentication, providing a voice recognition service through the electronic apparatus, and performing a second authentication based on data corresponding to the specific word among data of a second input voice that is input while the voice recognition service is provided and the speaker model.

The performing of the second authentication may include comparing the data corresponding to the specific word among the data of the second input voice that is input while the voice recognition service is provided with the speaker model and a pre-stored personator model, wherein the personator model includes characteristic information of a voice different from the voice of the user.

The performing of the second authentication may include obtaining a phoneme matching at least one of a plurality of phonemes constituting the specific word among phonemes corresponding to the second input voice that is input while the voice recognition service is provided, determining a first similarity between characteristic information of the first input voice corresponding to the obtained phoneme, and characteristic information of the speaker model, and performing the second the authentication based on the determined first similarity.

The performing of the second authentication may include determining a second similarity between characteristic information of the obtained phoneme and characteristic information of a pre-stored personator model, and performing the second authentication based on the determined first similarity and the determined second similarity, wherein the personator model includes characteristic information of a voice different from the voice of the user.

The performing of the second authentication may include, based on a ratio of the determined first similarity to the determined second similarity being greater than a first threshold value, determining that the second authentication is successful, and based on the ratio of the determined first similarity to the determined second similarity being equal to or smaller than a first threshold value, determining that the second authentication is failed.

The method may further include, based on determination that the second authentication is failed, updating the personator model based on characteristic information of at least one of the first input voice that succeeds in the first authentication or the second input voice that is input while the voice recognition service is provided.

The method may further include, based on determination that the second authentication is failed, terminating the voice recognition service.

The method may further include continuing the providing of the voice recognition service based on the second authentication being successful, and performing the second authentication again based on data of additional voice that is input after the second authentication is successful.

The method may further include, based on a previous voice input before the voice recognition service is provided corresponding to the specific word, performing the first authentication by comparing data of the first input voice with the speaker model and a pre-stored personator model, wherein the personator model includes characteristic information of a voice different from the voice of the user.

According to an embodiment, there is provided a non-transitory computer readable medium storing a program, when executed by a processor of an electronic apparatus, causes the electronic apparatus to perform an operation, wherein the operation comprises, based on a first input voice corresponding to a specific word, performing a first authentication based on data of the first input voice and a pre-stored speaker model including characteristic information of a voice of a user corresponding to the specific word, based on the performed first authentication, providing a voice recognition service through the electronic apparatus, and performing a second authentication based on data corresponding to the specific word among data of a second input voice that is input while the voice recognition service is provided, and the speaker model.

An electronic apparatus and a controlling method thereof according to the disclosure has an effect of improving security for the user of the electronic apparatus because additional speaker authentication is performed while a voice recognition service is provided even if a personator succeeds in speaker authentication for fixed vocabulary by recording or voice imitation.

The additional speaker authentication performed while a voice recognition service is provided has an advantage in that the speaker authentication cannot be performed by the electronic apparatus itself without a separate operation, and various voices uttered by a user or a personator for using the voice recognition service is subjected to speaker authentication, and thus the personator cannot easily access.

The electronic apparatus and the control method thereof according to the disclosure, by way of updating a personator model based on a voice that fails in at least one speaker authentication, the personator who ever fails in the speaker authentication may face difficulty of using the voice recognition service of the electronic apparatus.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION OF EXEMPLARY EMBODIMENTS

Before describing the disclosure in detail, the description of the specification and drawings will be described.

All the terms used in this specification including technical and scientific terms have the same meanings as would be generally understood by those skilled in the related art. However, these terms may vary depending on the intentions of the person skilled in the art, legal or technical interpretation, and the emergence of new technologies. In addition, some terms are arbitrarily selected by the applicant. These terms may be construed in the meaning defined herein and, unless otherwise specified, may be construed on the basis of the entire contents of this specification and common technical knowledge in the art.

The invention is not limited to an embodiment disclosed below and may be implemented in various forms and the scope of the invention is not limited to the following embodiments. In addition, all changes or modifications derived from the meaning and scope of the claims and their equivalents should be construed as being included within the scope of the present disclosure. In the following description, the configuration which is publicly known but irrelevant to the gist of the present disclosure could be omitted.

The terms such as "first," "second," and so on may be used to describe a variety of elements, but the elements should not be limited by these terms. The terms are used simply to distinguish one element from other elements. The use of such ordinal numbers should not be construed as limiting the meaning of the term. For example, the components associated with such an ordinal number should not be limited in the order of use, placement order, or the like. If necessary, each ordinal number may be used interchangeably.

The singular expression also includes the plural meaning as long as it does not differently mean in the context. In this specification, terms such as 'include' and 'have/has' should be construed as designating that there are such features, numbers, operations, elements, components or a combination thereof in the specification, not to exclude the existence or possibility of adding one or more of other features, numbers, operations, elements, components or a combination thereof.

In an exemplary embodiment, 'a module', 'a unit', or 'a part' perform at least one function or operation, and may be realized as hardware, such as a processor or integrated circuit, software that is executed by a processor, or a combination thereof. In addition, a plurality of 'modules', a plurality of 'units', or a plurality of 'parts' may be integrated into at least one module or chip and may be realized as at least one processor except for 'modules', 'units' or 'parts' that should be realized in a specific hardware.

When an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include another component instead of excluding another component unless there is different disclosure.

Figure 2:
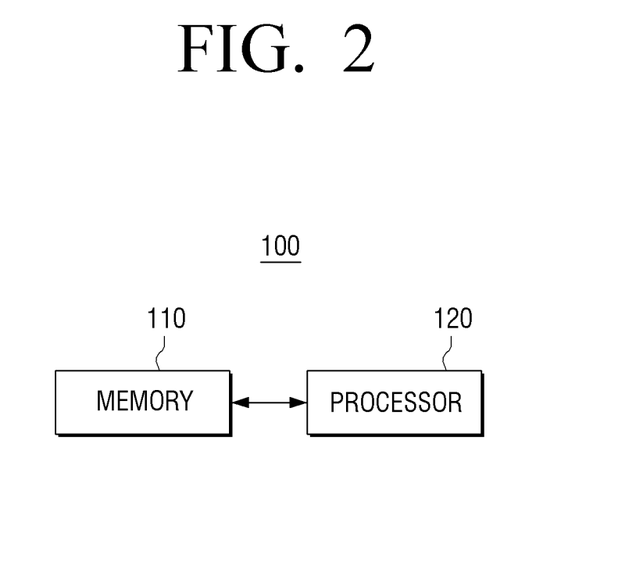
FIG. 2 is a block diagram to explain constituent elements of an electronic apparatus according to an embodiment of the disclosure.

FIG. 2 is a block diagram to explain constituent elements of an electronic apparatus according to an embodiment of the disclosure. The electronic apparatus 100 may be implemented as a TV, a smart TV, a desktop PC, a laptop, a monitor, or the like, including a display for displaying images, or a terminal device such as a smart phone. Also, the electronic apparatus 100 may be implemented as a set-top box, Over the Top (OTT), or the like.

Referring to FIG. 2, an electronic apparatus 100 may include a memory 110 and a processor 120.

The memory 110 may be configured to store commands, instructions or data including those related to constituent elements of an operation system (OS) for controlling the overall operations of constituent elements of the electronic apparatus 100 and the constituent elements of the electronic apparatus 100.

The memory 110 may be implemented as a nonvolatile memory (ex: hard disk, solid state drive (SSD), flash memory), volatile memory, or the like.

The memory 110 may store a speaker model including data for user voice corresponding to a specific word. To be specific, the memory 110 may store a speaker model including characteristic information of a signal obtained by digitalizing user's voice corresponding to a specific word. The user's voice corresponding to the specific word may be a voice that occurs when a pre-registered user of the electronic apparatus 100 utters a specific word.

The feature information on the voice may be various parameters obtained through digitization, frequency conversion, and the like for the voice such as Pitch, Formant, Linear Predictive Cepstral Coefficient (LPCC), Mel-Frequency Cepstral Coefficient (MFCC), Perceptual Linear Predictive (PLP), etc.

Characteristic information of a user's voice corresponding to a specific word may include time-division information based on each phoneme string constituting a specific word of the user's voice corresponding to the specific word, frequency conversion characteristic matched with each phoneme string, and the like.

The memory 110 may store information on a voice recognition service provided by the electronic apparatus 100.

The voice recognition service may be a service in which the electronic apparatus 100 receives a voice, and the electronic apparatus 100 performs at least one operation according to contents of texts converted from the input voice. The voice recognition service may be a service in which the electronic apparatus 100 receives voices, but an external device (not shown) performs the operation according to contents of texts converted from the input voice based on the electronic apparatus 100 and the external device (not shown). In addition, the voice recognition service may be a service in which the external device 100 receives a voice, and the electronic apparatus 100 performs the operation according to contents of texts converted from the input voice based on communication between the electronic apparatus 100 and the external device (not shown). Other than that, if voice input or operation performance are performed through a system including the electronic apparatus 100, it could be regarded as a voice recognition service.

The voice recognition service may include a process of guiding utterance for receiving voices.

The memory 110 may store a voice recognition service in the form of at least one of task and/or application.

By comparing characteristic information of a voice input into the electronic apparatus 100 with characteristic information included in at least one speaker model stored in the memory 110, the memory 110 may store a trained artificial intelligence model to determine whether the input voice is uttered by a speaker same as the speaker of a voice based on the stored speaker model, and whether the uttered text is the same as the text to be the basis of the stored speaker model.

The processor 120 may control the overall operation of the electronic apparatus 100.

The processor 120 may include a random access memory (RAM) (not shown), a read only memory (ROM) (not shown), a central processing unit (CPU), a graphic processing unit (not shown), and a system bus (not shown), and may perform operations and data processing related to control of other components included in the electronic apparatus 100.

When the input voice corresponds to a specific word, the processor 120 may perform the first authentication based on the data for the input voice and the pre-stored speaker model. Based on the first authentication, the electronic apparatus 100 may provide a voice recognition service.

The input voice may be a voice input through a microphone (not shown) provided in the electronic apparatus 100. The input voice may be a voice input through the microphone (not shown) provided in the external device (not shown). The voice input through the microphone (not shown) of the external device (not shown) may be processed or converted in the form of a signal or data, and received through the communicator (not shown) of the electronic apparatus 100, the broadcast receiver (not shown), the input/output port (not shown), etc.

The processor 120 may convert the input voice into a text format, and identify whether the text matches a specific word.

As a result of identification, if the text matches the specific words, the processor 120 may compare the data for the input voice with the speaker model pre-stored in the memory 110. To be specific, the characteristic information for the signal obtained by digitalizing the input voice may compare to the characteristic information of the speaker model pre-stored in the memory. In this case, the artificial intelligence model stored in the memory 110 may be used.

For example, when a speaker model for a pre-stored user voice corresponding to "Hello" is stored, the processor 120 may identify whether the input voice corresponds to the word of "Hello", and as a result of identification, if the voice corresponds to the word, the degree of the similarity between the characteristic information of the input voice and the characteristic information of the stored speaker model may be identified.

As a result of identification, if the similarity is equal to or more than a predetermined value, the processor 120 may determine that the first authentication is successful, and start the providing of the voice recognition service through the electronic apparatus 100.

The processor 120 may perform the first authentication by using a personator model including characteristic information for a voice different from a user voice as well as a speaker model of a proper user pre-registered in the electronic apparatus 100. The personator model may be stored in the memory 110.

When the input voice corresponds to a specific words, the processor 120 may compare data for the input voice with the personator model and the speaker model to perform first authentication.

For example, the processor 120 may obtain a ratio of a similarity between characteristic information of the input voice and the characteristic information of the personator model to a similarity between the characteristic information of the input voice and the characteristic information of the speaker model, and if the obtained ratio is equal to or more than a predetermined value, it may be determined that the first authentication information is successful.

The voice to be input for performing the first authentication may be a voice corresponding to two or more specific words, not one word. In this case, the processor 120 may use a speaker model for a user voice corresponding to two or more specific words.

After the first authentication is successful, the processor 120 may perform second authentication based on data corresponding to a specific word among data for the voice input while a voice recognition service is provided, and the speaker model.

The speaker model may be a model same as the speaker model used for the first authentication. The specific word may match the text converted from the voice to be input for performing first authentication, and may be the same word corresponding to the voice in which the characteristic information included in the speaker model is extracted.

The processor 120 may obtain a phoneme matched with at least one of a plurality of phonemes constituting a specific word among phonemes include in the voice input while the voice recognition service is provided, compare the characteristic information of the input voice corresponding to the obtained phoneme with the characteristic information of the speaker model, and perform the second authentication. The processor 120 may determine a first similarity between the characteristic information of the input voice corresponding to the obtained phoneme and the characteristic information of the speaker model, and perform the second authentication based on the determined first similarity.

For example, in a state where a speaker model for the user voice corresponding to "Hello" is stored in the memory 110, when the voice corresponding to the text "House" is input while the voice input service is being provided, phonemes included in "Hello" and "House" may be "H-". The processor 120 may compare the characteristic information corresponding to "H-" among the characteristic information of the speaker model corresponding to "Hello" with the characteristic information corresponding to "H-" of "House" among the input voice to perform second authentication.

The processor 120 may perform the second authentication using a personator model including the characteristic information for a voice different from a user voice as well as a speaker model of a proper user pre-registered in the electronic apparatus 100. In this case, the personator model may be stored in the memory 110.

The processor 120 may compare data corresponding to a specific word among data for the voice input while the voice recognition service is provided with the speaker model and the personator model and to perform second authentication.

The processor 120 may obtain a phoneme matched with at least one of a plurality of phonemes constituting a specific word among phonemes included in the voice input while the voice recognition service is provided, determine the second similarity between the characteristic information of the input voice corresponding to the obtained phoneme with the characteristic information of the personator model to perform second authentication.

In this case, the processor 120 may perform the second authentication based on the first similarity and the second similarity, specifically, if the ratio of the first similarity to the second similarity is greater than a first threshold value, it may be determined that the second authentication is successful, and if the ratio of the first similarity to the second similarity is smaller than a first threshold value, it may be determined that the second authentication is failed.

When the second authentication is determined as being failed, the processor 120 may update a personator model stored in the memory 110 based on characteristic information of at least one of an input voice successful for the first authentication or a voice input while the voice recognition service is provided. As a result, the accuracy of the first authentication and the second authentication may be improved.

When the second authentication is determined as being failed, the characteristic information included in the personator model may be changed by adding the characteristic information of the input voice successful for the first authentication and/or using the characteristic information of the input voice successful for the first authentication. In addition, the characteristic information included in the personator model may be changed by adding the characteristic information of the voice input while the voice recognition service is provided and/or using the characteristic information of the voice input while the voice recognition service is provided.

Even if the input voice has succeeded in the first authentication, because the second authentication based on a different voice of the utterer of the voice failed, the processor 120 may add at least part of the characteristic information of the voice to the personator model. As a result, when the same voice or a different voice from the same utterer of the voice is input again afterwards, and the first authentication is tried, the possibility of failure of the first authentication may be increased.

When the second authentication is determined to be failed, the processor 120 may terminate the voice recognition service through the electronic apparatus 100. However, when the second authentication is successful, the processor 120 may maintain to provide the voice recognition service, and perform the second authentication based on the voice input after the second authentication is successful.

Once the first authentication is successful, it may not be performed again until the voice recognition service terminates. However, the second authentication may be continuously performed by using a newly input voice while the voice recognition service is provided. In addition, when the second authentication is failed more than once, the processor 120 may terminate the provided voice recognition service.

As such, the second authentication may be performed by itself/repeatedly by the processor 120 without a separate operation of a user once a voice is input, and various voices uttered by the user or the personator may be subjected to the second authentication while the voice recognition service is used. Therefore, it may be difficult to continuously perform the second authentication based on the voice of the personator input while the voice recognition service is used. Therefore, the electronic apparatus 100 for performing the second authentication may make it difficult for the personator, not a proper user, to continuously use the voice recognition service.

The above-described example only describes the process of terminating the voice recognition service when the second authentication is failed. However, when the second authentication is failed, the processor 120 may change the electronic apparatus 100 to a lock state, or terminate the providing of the tasks and/or applications corresponding to other services other than the voice recognition service.

In addition, when the voice recognition service terminates based on the user command, etc. input through the user inputter (not shown) while the voice recognition service is provided, the processor 120 may not provide a voice recognition service. Therefore, the processor 120 may perform the first authentication again based on data for newly input voice. The processor 120 may provide a voice recognition service only when the first authentication is successful.

Figure 3:
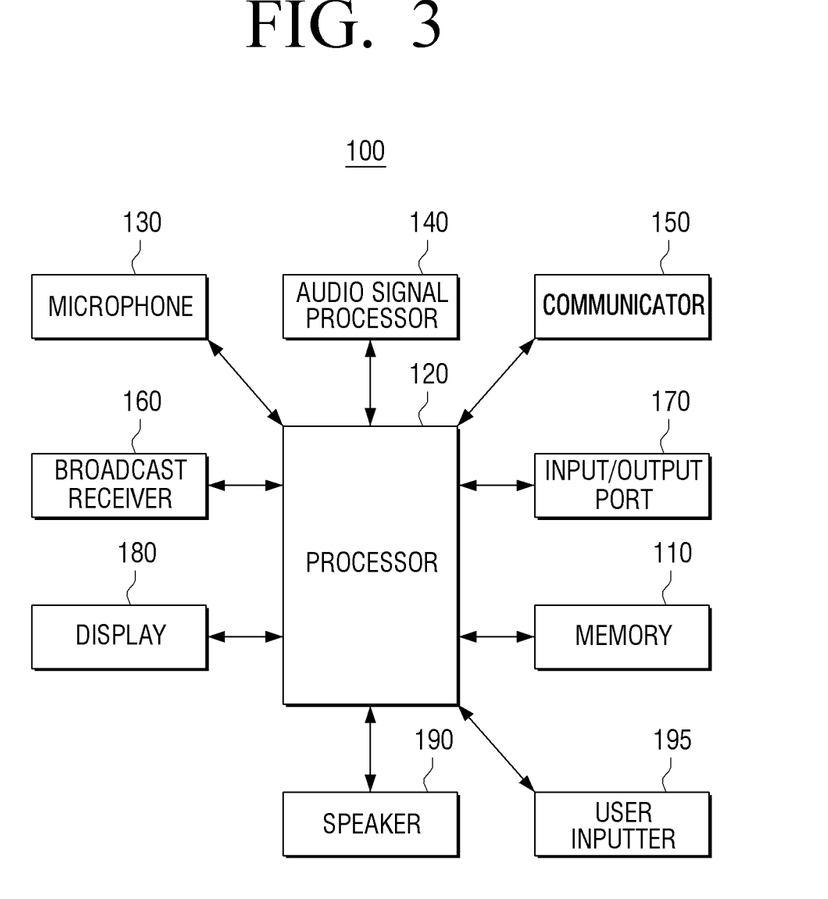
FIG. 3 is a block diagram to explain a detailed configuration of an electronic apparatus according to various embodiments of the disclosure.

FIG. 3 and FIGS. 4A, 4B and 4C are block diagram and views to explain a detailed configuration of an electronic apparatus 100 according to various embodiments of the disclosure;

Referring to FIG. 3, an electronic apparatus 100 may include at least one of a memory 110, a processor 120, a microphone 130, an audio signal processor 140, a communicator 150, a broadcast receiver 160, an input/output port 170, a display 180, and a speaker 190.

The microphone 130 may be configured to receive an external voice, and generate a voice signal corresponding to an input voice.

The microphone 130 may be included in the electronic apparatus 100, but a microphone (not shown) may be provided in an external device, and a voice signal input through the microphone (not shown) may be digitalized to be received at the electronic apparatus 100, and then used for voice recognition for authentication or a voice recognition service.

Figure 4A:
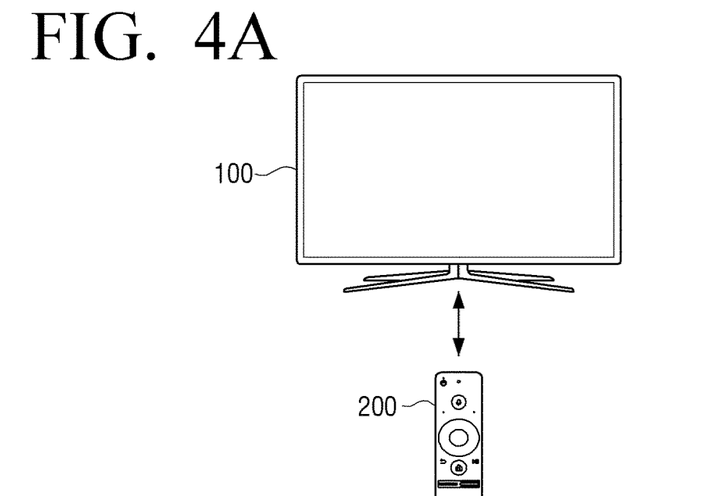
FIGS. 4A, 4B and 4C are views to explain various embodiments of an electronic apparatus according to the disclosure.
Figure 4B:
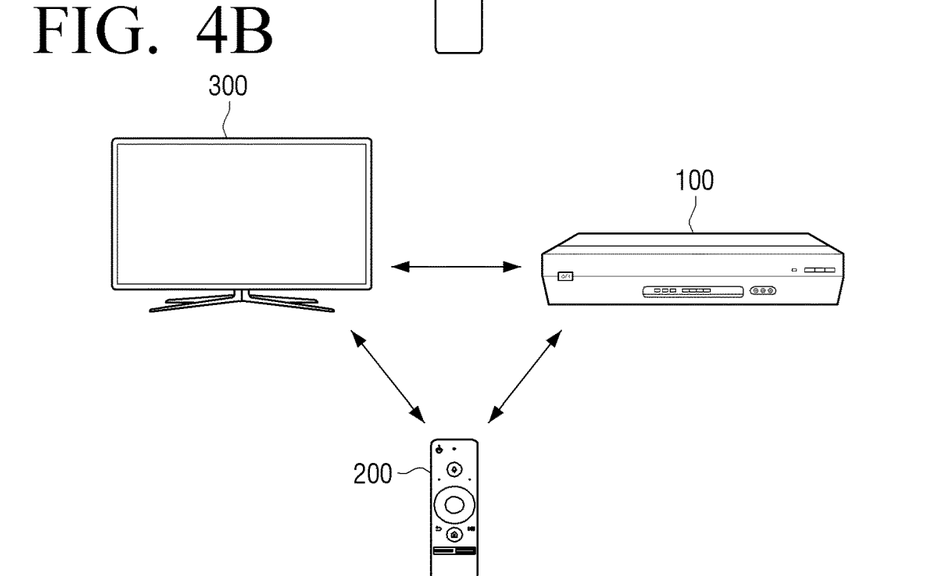

Referring to FIGS. 4A and 4B, when there is a remote control device 200 for controlling the electronic apparatus 100 such as a TV or a set-top box, the microphone 130 may be included in the electronic apparatus 100, or the microphone (not shown) may be included in the remote control device 200 so that the voice input through the microphone (not shown) provided in the remote control device 200 may be digitalized, received at the electronic apparatus 100 through the communicator, and used for speaker authentication or voice recognition for a voice recognition service.

The electronic apparatus 100 may use Bluetooth, Wi-Fi, Ethernet, infrared communication, etc., and may include a module for performing communication with the remote control device 200 and a module for performing communication with a server (not shown) as separated ones. For example, the electronic apparatus 100 may perform communication with a server through an Ethernet modem or a WiFi module, and perform communication with the remote control device 200 through a Bluetooth module.

Unlike FIGS. 4A and 4B, a voice input through a microphone (not shown) of a smart phone (not shown) where a remote control application and/or a voice recognition application is stored instead of a remote control device (not shown) may be digitalized, received at the electronic apparatus 100 which is a TV or a set-top box through the communicator 150, and used for speaker authentication or voice recognition for a voice recognition service.

The audio signal processor 140 may be configured to process a voice signal input through the microphone 130. The audio signal processor 140 may include an Analog-Digital Converter (ADC), a noise remover (not shown), etc.

The ADC (not shown) may convert a multichannel analog signal input from the microphone 130 into a digital signal, and the noise remover (not shown) may remove noise components from the digital signal including noise components and user voice components. The noise remover (not shown) may output a digital signal from which noise components are removed to the processor 120.

The processor 120 may extract characteristic information on linear predictive coefficient, Cepstrum, Mel Frequency Cepstral Coefficient (MFCC), and Filter Bank Energy by frequency band for a digital voice signal from which noise components have been removed.

The processor 120 may perform recognition on a voice input through at least one of Dynamic Time Warping (DTW), hidden Markov Modelling (HMM), and Neural Networks based on the extractor characteristic information and the speaker model using an artificial intelligence model stored in the memory 110.

The processor 120 may perform communication with various external devices using the communicator 150. The communicator 150 may perform data communication with an external device (not shown) in a wireless/wired manner.

When performing data communication with an external device through a wireless communication method, the communicator 150 may include at least one of a WIFI DIRECT communication module, a Bluetooth module, an infrared data association (IrDA) Module, a Near Field Communication (NFC) module, a Zigbee module, a cellular communication module, a third generation (3G) mobile communication module, a fourth generation (4G) mobile communication module, or a fourth generation Long Term Evolution (LTE).

When performing data communication with an external device in a wired communication method, the communicator 150 may include an interface module such as a USB, and be physically connected to an external terminal device such as a PC through an interface module to transmit and receive voice or image data, or firmware data for performing firmware upgrade.

The communicator 150 may include a first communicator (not show) for transmitting and receiving data to or from the remote control device (not shown) and a second communicator (not shown) for transmitting and receiving data to or from an external server (not shown). The first communicator (not shown) may be embodied as an Ethernet modem, a Wi-Fi module, and a Bluetooth module, and the second communicator may be embodied as a separate Wi-Fi module.

The broadcast receiver 160 may receive signals for broadcasting contents. The broadcasting contents may include image, video, and additional data (e.g., EPG), and the broadcast receiver 160 may receive broadcast content signals from various sources such as terrestrial broadcast, cable broadcast, satellite broadcast, internet broadcast, and the like.

The broadcast receiver 160 may be configured to include a tuner (not shown), a demodulator (not shown), an equalizer (not shown), and the like in order to receive broadcast content transmitted from a broadcasting station.

Through the input/output port 170, the electronic apparatus 100 may receive signals for images and/or voices from an outside or transmit image and/or voice signals to the outside.

For this purpose, the input/output port 170 may be implemented as a wired port such as an HDMI port, a display port, an RGB port, a Digital Visual Interface (DVI) port, a Thunderbolt, and a component port. Alternatively, the input/output port 170 may be implemented as a port for wireless communication such as Wi-Fi or Bluetooth communication.

The input/output port 170 may be embodied as a HDMI port or a Thunderbolt, etc. to transmit images and voice signals, or may include the first port for transmitting image signals and the second port for transmitting voice signals as separated ones.

For example, referring to FIG. 4A when the electronic apparatus 100 is TV, etc. including a display, the electronic apparatus 100 may receive signals on image and/or voices from an external device (not shown) such as a set-top box through the input/output port 170.

According to another embodiment, referring to FIG. 4B, when the electronic apparatus 100 is embodied as a set-top box, ext., the electronic apparatus 100 may transmit images and/or voice to the external device 300 through the input/output port 170 so that images and/or voices may be output through the external device 300 such as a TV.

The display 180 may display an image under the control of the processor 120. The display 180 may be implemented as a liquid crystal display (LCD), a plasma display panel (PDP), an organic light emitting diode (OLED), or a transparent OLED (TOLED). When the display 170 is embodied with LCD, the display 180 may include a driving circuit (not shown) that can be embodied in the form of an a-Si TFT, a low temperature poly silicon (LTPS) TFT, an organic TFT (OTFT), etc. and a backlight unit (not shown).

The display 180 may be embodied in the form of a touch screen including a touch panel for sensing a touch operation of a user, and in this case, the display 180 may be included in a user inputter 195.

The display 180 may output an image included in a broadcast signal received through the broadcast receiver 160, an image included in a signal received through the communicator 150, an image input through the user inputter 195, an image included in an image file stored in the memory 110, and an image included in a signal received from an outside through the input/output port 170.

The speaker 190 may be configured to output a specific voice under the control of the processor 120. The speaker 190 may output a voice included in a broadcast signal received through the broadcast receiver 170, a voice included in a signal received through the communicator 150, a voice input through the microphone 130, a voice included in an audio file stored in the memory 110, a voice included in a signal received from an outside through the input/output port 170, etc.

Although not shown in FIG. 3, the electronic apparatus 100 may further include a headphone/earphone (not shown) other than the speaker 190.

The user inputter 195 may enable the electronic apparatus 100 to receive commands or information from a user.

The user inputter 195 may include a touch panel (not shown) embodied with the display 180, or a separate touch pad (not shown) in order to receive user commands or information by way of touch. The user inputter 195 may include the microphone 130 to receive user commands or information in voice.

The user inputter 195 may include at least one button, keyboard, or mouse (not shown) in order to receive information from a user.

Figure 4C:
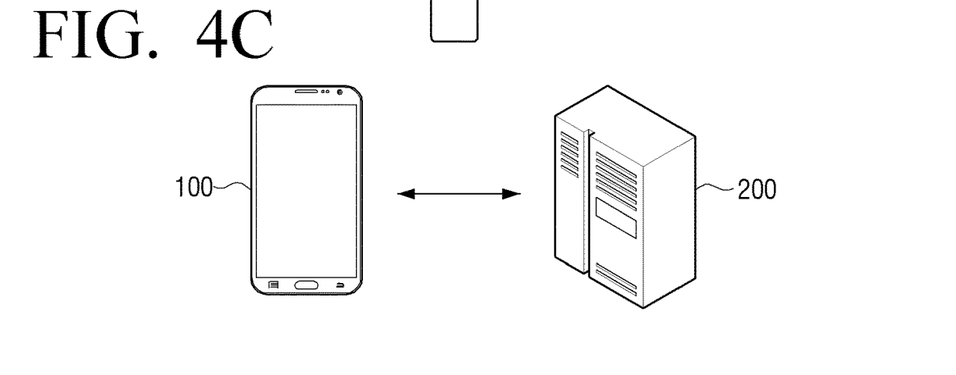

The above-described embodiments may be performed by the electronic apparatus 100 itself, but referring to FIG. 4C, the electronic apparatus 100 may be embodied as a mobile phone, and perform the above-described operations based on the communication with the server 200. Unlike FIG. 4C, the electronic apparatus 100 may be embodied as various electronic apparatuses such as a set-top box, a TV, or a PC. The server 200 may not be a server as one electronic apparatus, but may be a network including a plurality of server devices capable of communication.

For example, the electronic apparatus 100 that receives voices through the microphone 130 and the audio signal processor 140 to be digitalized, may merely transmit the digitalized voice signals to the server 200, but actual first authentication and/or second authentication may be performed by the server 200. When the electronic apparatus 100 is a TV or a set-top box, the electronic apparatus 100 may receive a voice signal input through the microphone (not shown) of the remote control device (or a smartphone in which a remote control application is installed) to be digitalized, and transmit the digitalized voice signal to the server (not shown), and the server (not shown) may perform the first authentication and/or the second authentication.

The server 200 may user a speaker model and a personator model pre-stored in the server 200. The task and/or application for providing a voice recognition service may be stored in the memory 110 of the electronic apparatus 100, the server 200 may perform the first authentication and/or the second authentication and transmit data of the result thereof to the electronic apparatus 100, and the electronic apparatus 100 that receives the data may provide a voice recognition service based on the result thereof.

For example, when the signal corresponding to the voice input into the microphone 130 of the electronic apparatus 100 is transmitted to the server 20, and the server 100 performs the first authentication by receiving the signals, and then the first authentication is successful, the electronic apparatus 100 that receives information on the success of the first authentication from the server 200 may start to provide a voice recognition service. In the same manner, the voice input through the microphone 130 while the electronic apparatus 100 provides the voice recognition service may be digitalized and transmitted to the server 200, and when the second authentication based thereon of the server 200 is failed, the electronic apparatus 100 may terminate the providing of the voice recognition service based on the receipt of the information on the failure of the second authentication from the server 200.

For another example, the task and/or application for providing a voice recognition service may be stored in the server 200, and the electronic apparatus 100 may perform the first authentication and the second authentication based on the voice input through the microphone 130.

In this case, when the first authentication based on the input voice is successful, the electronic apparatus 100 may receive data for the task and/or application stored in the server 200 and provide a voice recognition service based thereon. In addition, when the second authentication based on the voice input while the voice recognition service is provided is failed, the electronic apparatus 100 may not receive data for providing a voice recognition service from the server 200.

As described above, in order to perform the first authentication or the second authentication, the input voice needs to be recognized and converted into texts. However, when the above-described example embodiments are performed by a remote control device (or a smartphone in which a remote control application is stored) for controlling an electronic apparatus other than the electronic apparatus, and/or at least one server (not shown) a path through which a voice is input, a subject for performing voice recognition, and a subject for comparing characteristic information for authentication may vary.

For example, a voice signal input into the microphone (not shown) of the remote control device (or the smartphone in which a remote control application is stored) may be digitalized and transmitted to the electronic apparatus 100 through Bluetooth or Wi-Fi communication, or the voice signal input through the microphone 130 in the electronic apparatus 100 may be digitalized through the audio signal processor 140.

The electronic apparatus 100 may directly recognize and covert the digitalized voice signal to obtain characteristic information of text and voice signals corresponding thereto. The electronic apparatus 100 may transmit the voice signals to the server (not shown). If the electronic apparatus 100 transmits the digitalized voice signal to the server (not shown), the server (not shown) may obtain the characteristic information of the texts corresponding to the voice signals and the voice signals and transmit the data to the electronic apparatus 100.

The electronic apparatus 100 may perform the first authentication and/or the second authentication by comparing a speaker model and/or the personator model stored in the electronic apparatus 100 with the received data.

In addition, when the server (not shown) that receives the digitalized voice signal from the electronic apparatus obtains characteristic information of texts and voice signals corresponding to voice signals and transmits the data, another server (not shown) may receive the data, compare the characteristic information of the voice signals with the pre-stored speaker model and personator model, perform the first authentication and/or the second authentication to transmit the result to the electronic apparatus 100.

Figure 5:
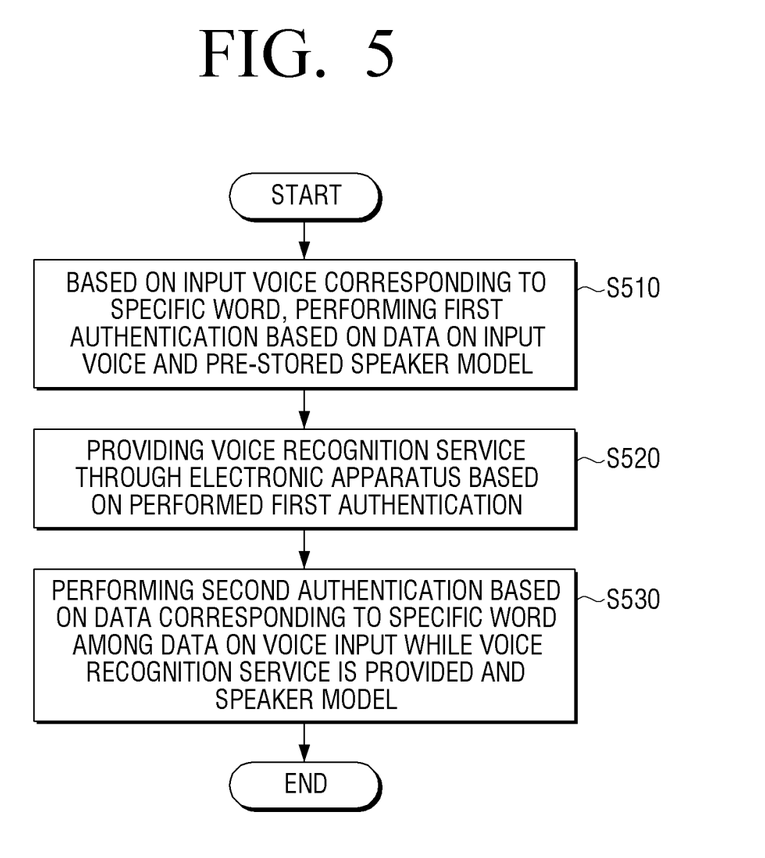
FIG. 5 is a flowchart to explain a method for controlling an electronic apparatus according to an embodiment of the disclosure.

FIG. 5 is a flowchart to explain a method for controlling an electronic apparatus according to an embodiment of the disclosure.

Referring to FIGS. 4A, 4B and 4C, the method may comprise, based on the input voice corresponding to a specific word, performing the first authentication based on the data for the input voice and the pre-stored speaker model at operation S510. The pre-stored speaker model may include characteristic information on the user voice corresponding to a specific word.

The first authentication may be performed by comparing the data for the input voice with the speaker model and the pre-stored personator model, respectively. In this case, the personator model may include characteristic information for another voice different from a user voice.

Based on the performed first authentication, a voice recognition service maybe provided through an electronic apparatus at operation S520. Providing a voice recognition service may refer to receiving a voice, recognizing a text corresponding to the input voice, and performing at least one operation based thereon. In this case, a process for inducing utterance may be performed such as providing a visual and auditory user interface (UI) for receiving a voice.

Based on the data corresponding to a specific word among data for a voice input while a voice recognition service is provided and a speaker model, the second authentication may be performed at operation S530. The speaker model may be the same as the speaker model used for the first authentication, and a specific word may correspond to the speaker model.

In this case, the second authentication may be performed by comparing data corresponding to a specific word among data for the voice input while a voice recognition service is provided with a speaker model and a pre-stored personator model.

To be specific, a phoneme matched with at least one of a plurality of phonemes constituting a specific word among phonemes included in the voice input while the voice recognition service is provide may be obtained, a first similarity between characteristic information of the input voice corresponding to the obtained phoneme and characteristic information of the speaker model may be determined, and the second authentication may be performed based on the determined first similarity.

In addition, the second similarity between characteristic information of an input voice corresponding to the obtained phoneme with characteristic information of the pre-stored personator model may be determined, and the second authentication may be performed based on the first similarity and the second similarity.

When the ratio of the first similarity to the second similarity is greater than a first threshold value, the second authentication may be determined to be successful, and when the ratio of the first similarity to the second similarity is equal to or smaller than the first threshold value, the second authentication may be determined to be failed.

The control method may comprise, based on the determination that the second authentication is failed, updating a personator model based on characteristic information of at least one of a voice input when the first authentication is successful, and a voice input while the voice recognition service is provided. In addition, when the second authentication is determined to be failed, the voice recognition service may be terminated.

When the second authentication is successful, providing a voice recognition service may be maintained, and after the second authentication is successful, the second authentication may be performed again based on the data for the input voice.

Figure 6:
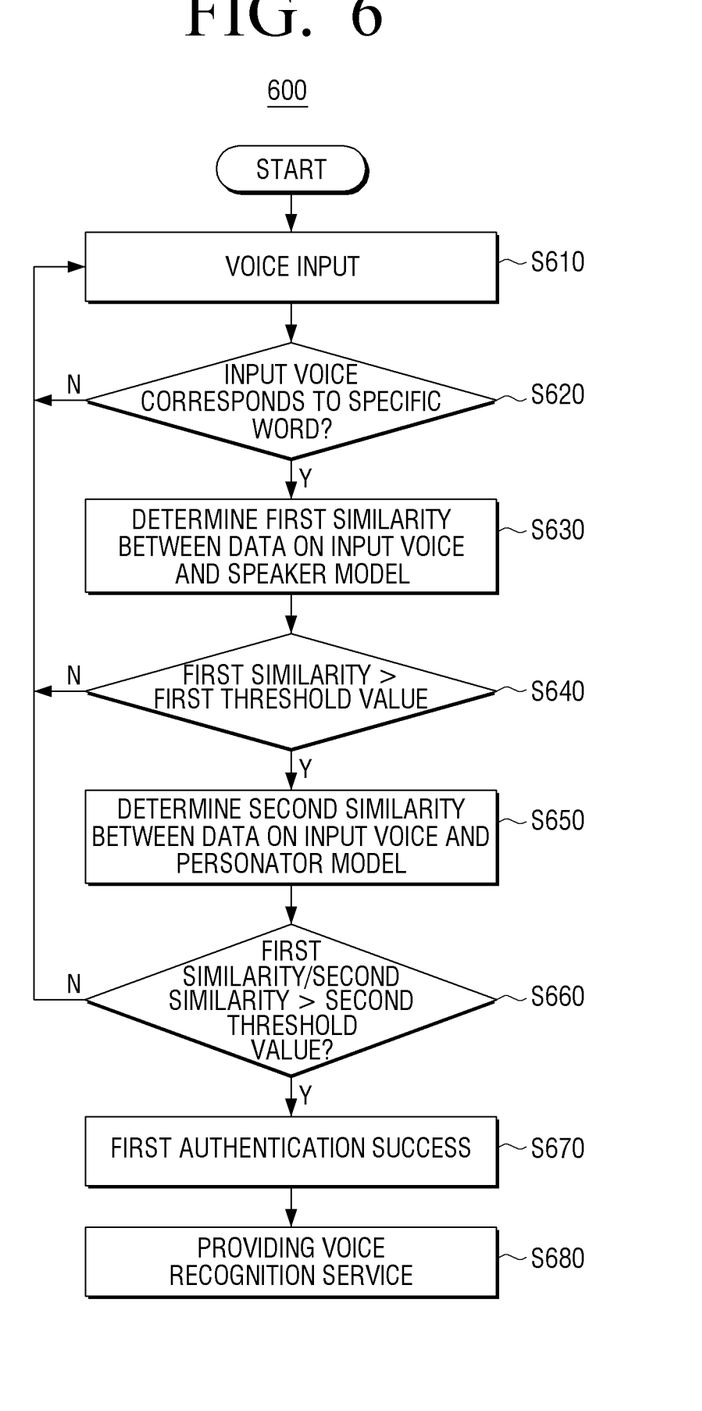
FIG. 6 is a view illustrating algorithms to explain an example of a detailed process for performing first authentication among processes of FIG. 5.

FIG. 6 is a view illustrating algorithms to explain an example of a detailed process for performing first authentication among processes of FIG. 5.

Referring to FIG. 6, when a voice is input into an electronic apparatus at operation S610, it may be identified whether the input voice corresponds to a specific word at operation S620. The input voice may be recognized and converted into texts, and the texts may be compared with the specific word.

If the input voice fails to correspond to a specific word at operation S620—N, the apparatus 100 may return to the operation of receiving a voice at operation S610, and if the input voice corresponds to the specific word at operation S620—Y, the first similarity between the data on the input voice and the speaker model may be determined at operation S630. To be specific, the first similarity between characteristic information of the input voice and characteristic information of the speaker model may be determined.

The speaker model may include characteristic information on the voice of the user that utters the specific word, and the user may be pre-registered as a proper user of the electronic apparatus.

In addition, whether the first similarity is greater than the first threshold value may be identified at operation S640.

When the first similarity is not greater than the first threshold value at operation S640—N, the first authentication may be determined as being failed, and the electronic apparatus may return to the operation S610.

When the first similarity is greater than the first threshold value at operation S640—Y, the second similarity between the data on the input voice and the personator model may be determined at operation S650. To be specific, the second similarity may be determined by comparing characteristic information of the input voice with characteristic personator model.

In this case, if the value obtained by dividing the first similarity by the second similarity is equal to smaller than the second threshold value at operation S660—N, the first authentication may be determined to be failed, the electronic apparatus may not return to the operation of receiving a voice again at operation S610. If the value obtained by dividing the first similarity by the second similarity is greater than the second threshold value at operation S660—Y, the first authentication may be determined to be successful at operation S670, and the electronic apparatus may start to provide a voice recognition service at operation S680.

Unlike FIG. 6, as long as the first similarity is greater than the first threshold value at operation S640—Y, the first authentication may be determined to be successful at operation S670, and the voice recognition service may be provided at operation S680. Without the operation of comparing the first similarity with the first threshold value S640, a ratio between the first similarity and the second similarity may be compared with the second threshold value at operation S660.

Figure 7:
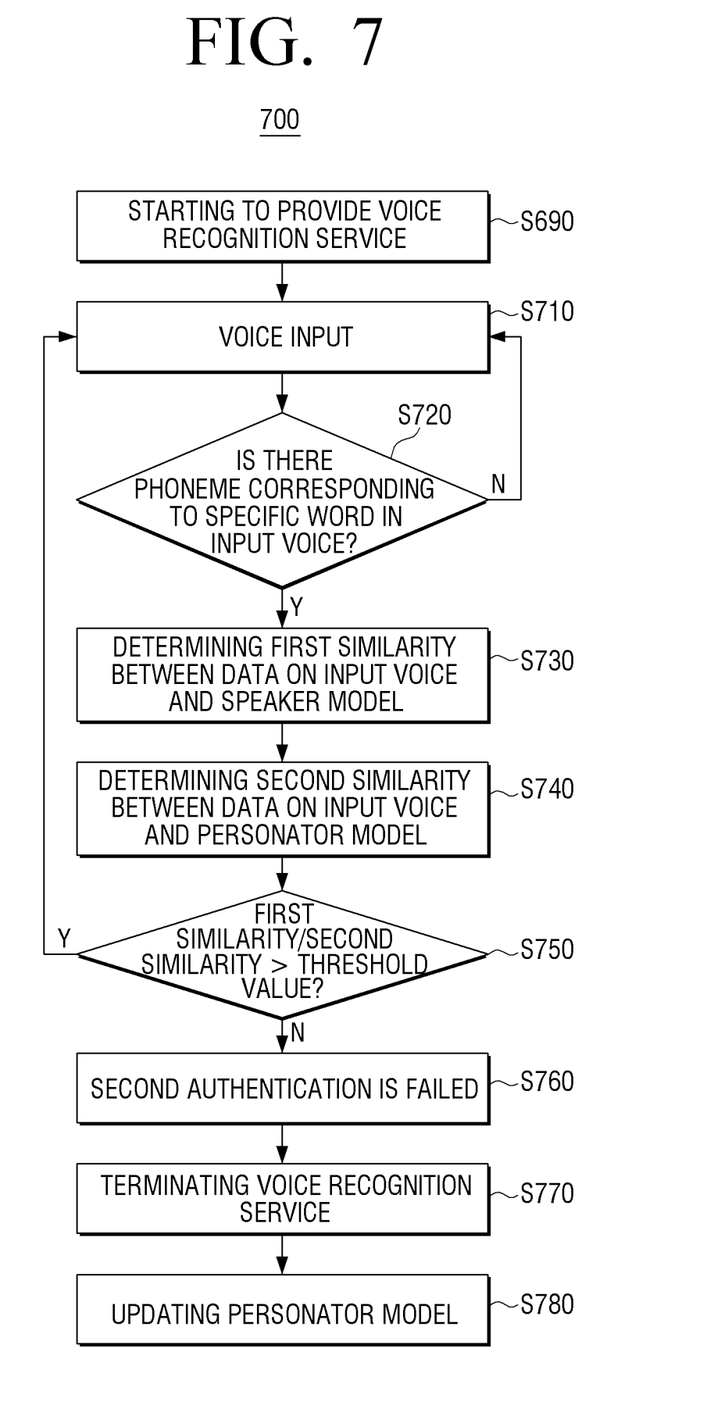
FIG. 7 is view illustrating algorithms to explain an example of a detailed process for performing second authentication among processes of FIG. 5.

FIG. 7 is view illustrating algorithms to explain an example of a detailed process for performing second authentication among processes of FIG. 5.

Referring to FIG. 7, the second authentication at operation S710 to S750 may be performed after the voice recognition service is provides based on the success of the first authentication at operation S690. The operations S710 to S750 for performing the second authentication may assume that the voice recognition service is provided. If the providing of the voice recognition service is terminated based on the user command, the electronic apparatus may return to the operation S610 and perform the first authentication again.

Referring to FIG. 7, when the voice recognition service starts to be provided based on the success of the first authentication at operation S690, the voice may be input at operation S710. The input voice may be a voice to use a voice recognition service.

Whether there is a phoneme corresponding to a specific word among the input voices may be identified at operation S720. To be specific, it may be identified whether there is a phoneme matching at least one of a plurality of phonemes included in a specific word in the text converted from the recognized input voice.

If there is no phoneme corresponding to a specific word among the input voice at operation S720—N, the electronic apparatus may return to the operation of receiving a voice again at operation S710. If there is a phoneme corresponding to a specific word among the input voice at operation S720—Y, the similarity between the data for the input voice and the speaker model may be determined at operation s730.

To be specific, the similarity between characteristic information related to an object phoneme and characteristic information related to an object phoneme of the characteristic information of the speaker model may be determined.

The second similarity between the data for the input voice and the personator model may be determined at operation S740. To be specific, the second similarity between characteristic related to an object phone corresponding to a specific word among the characteristic information of the input voice and at least part of the characteristic information of the personator model may be determined.

If the value obtained by dividing the first similarity by the second similarity is greater than a threshold value at operation S750—Y, the second authentication may be determined to be successful, and the electronic apparatus may return to the operation of receiving a voice at operation S710, and perform the second authentication again.

If the value obtained by dividing the first similarity by the second similarity is equal to or smaller than a threshold value at operation S750—N, the second authentication may be determined to be failed at operation S760, and the voice recognition service may be terminated at operation S770.

In this case, the personator model may be updated based on characteristic information of a voice failed in the second authentication as a voice input while the voice recognition service is provided, and/or the personator model may be updated based on characteristic information of an input voice that successes in the first authentication as a voice input before the voice recognition service is provided at operation S780.

Although not shown in FIG. 7, the operation of determining whether the first similarity determined at operation S730 is greater than a predetermined threshold value may be added as a next operation of the operation S730. In this case, if the first similarity is greater than a predetermined threshold value, the operation may move to the operation S740. If the first similarity is equal to or smaller than a predetermined threshold value, the second authentication may be determined to be failed at operation S760, and the voice recognition service may be terminated at operation S770.

Various example embodiments for a method for controlling an electronic apparatus described in FIG. 5 to FIG. 7 may be embodied as at least one of constituent elements of the electronic apparatus 100 illustrated in FIG. 2 to FIG.

Various example embodiments for a method for controlling an electronic apparatus described in FIG. 5 to FIG. 7 may be embodied through a system including the electronic apparatus 100 and at least external device (not shown) or more.

Meanwhile, the various embodiments described above can be implemented in a recording medium that can be read by a computer or a similar device using software, hardware, or a combination thereof.

According to a hardware implementation, the embodiments described in this disclosure may be implemented as application specific integrated circuits (ASICs), digital signal processors (DSPs), digital signal processing devices (DSPDs), programmable logic devices (PLDs) programmable gate arrays, a processor, a controller, a micro-controller, a microprocessor, and an electrical unit for performing other functions.

In some cases, the embodiments described herein may be implemented by processor 120 itself. According to software implementation, embodiments such as the procedures and functions described herein may be implemented in separate software modules. Each of the software modules may perform one or more of the functions and operations described herein.

Computer instruction(s) for performing a processing operation(s) of an electronic apparatus 100 in accordance with various embodiments described above may be stored in a non-transitory computer-readable medium. The computer instructions stored in the non-volatile computer-readable medium cause a particular device to perform the processing operation on the electronic apparatus 100 according to various embodiments described above when executed by the processor of the particular device.

The non-transitory computer readable medium refers to a medium that stores data semi-permanently rather than storing data for a very short time, such as a register, a cache, and a memory, and is readable by an apparatus. Specifically, the above-described various applications or programs may be stored in a non-transitory computer readable medium such as a compact disc (CD), a digital versatile disk (DVD), a hard disk, a Blu-ray disk, a universal serial bus (USB) memory stick, a memory card, and a read only memory (ROM), and may be provided.

Although embodiments have been shown and described, it will be appreciated by those skilled in the art that changes may be made to these embodiments without departing from the principles and spirit of the disclosure. Accordingly, the scope of the invention is not construed as being limited to the described embodiments, but is defined by the appended claims as well as equivalents thereto.

What is claimed is:

1. An electronic apparatus, comprising:
a memory to store a speaker model including characteristic information of a voice of a pre-registered user of the electronic apparatus corresponding to a specific word and a personator model including characteristic information of a voice different from the voice of the pre-registered user; and
a processor configured to:
in response to a first input voice corresponding to the specific word, perform a function corresponding to a voice recognition by a first authentication performed based on data of the first input voice, the speaker model, and the personator model, and
perform a second authentication based on data corresponding to the specific word among data of a second input voice that is input while the function corresponding to the voice recognition is provided with the speaker model, wherein
the processor is further configured to:
obtain a phoneme matching of at least one of a plurality of phonemes constituting the specific word among phonemes corresponding to the second input voice that is input while the function corresponding to the voice recognition is performed,
determine a first similarity between characteristic information of the first input voice corresponding to the obtained phoneme and characteristic information of the speaker model,
determine a second similarity between the characteristic information of the first input voice corresponding to the obtained phoneme and characteristic information of the personator model, and
based on a ratio of the determined first similarity to the determined second similarity being greater than a first threshold value, determine that the second authentication is successful, and based on the ratio of the determined first similarity to the determined second similarity being equal to or smaller than the first threshold value, determine that the second authentication is failed.

2. The electronic apparatus as claimed in claim 1, wherein the processor is further configured to:
perform the second authentication by comparing the data corresponding to the specific word among the data of the second input voice that is input while the function corresponding to the voice recognition is performed with the speaker model and the personator model.

3. The electronic apparatus as claimed in claim 2, wherein the processor is further configured to, based on determination that the second authentication is failed, update the personator model based on characteristic information of at least one of the first input voice that succeeds in the first authentication and the second input voice that is input while the function corresponding to the voice recognition is performed.

4. The electronic apparatus as claimed in claim 1, wherein the processor is further configured to, based on determination that the second authentication is failed, terminate the function corresponding to the voice recognition.

5. The electronic apparatus as claimed in claim 1, wherein the processor is further configured to, based on the second authentication being successful, continue the providing of the function corresponding to the voice recognition, and perform the second authentication again based on data of additional voice that is input after the second authentication is successful.

6. The electronic apparatus as claimed in claim 1, wherein the processor is further configured to, based on a previous voice input before the function corresponding to the voice recognition is performed corresponding to the specific word, compare the data of the first input voice with the speaker model and the personator model to perform the first authentication.

7. A method for controlling an electronic apparatus, the method comprising:
in response to receiving a first input voice corresponding to a specific word, performing a function corresponding to a voice recognition by a first authentication performed based on data of the first input voice, a pre-stored speaker model including characteristic information of a voice of a pre-registered user of the electronic apparatus corresponding to the specific word, and a pre-stored personator model including characteristic information of a voice different from the voice of the pre-registered user; and
performing a second authentication based on data corresponding to the specific word among data of a second input voice that is input while the function corresponding to the voice recognition is provided with the speaker model,
wherein the performing of the second authentication comprises:
obtaining a phoneme matching of at least one of a plurality of phonemes constituting the specific word among phonemes corresponding to the second input voice that is input while the function corresponding to the voice recognition is performed;
determining a first similarity between characteristic information of the first input voice corresponding to the obtained phoneme, and characteristic information of the pre-stored speaker model,
determining a second similarity between characteristic information of the obtained phoneme and characteristic information of the pre-stored personator model; and
based on a ratio of the determined first similarity to the determined second similarity being greater than a first threshold value, determining that the second authentication is successful, and based on the ratio of the determined first similarity to the determined second similarity being equal to or smaller than the first threshold value, determining that the second authentication is failed.

8. The method as claimed in claim 7, wherein the performing of the second authentication comprises comparing the data corresponding to the specific word among the data of the second voice input while the function corresponding to the voice recognition is performed with the pre-stored speaker model and the pre-stored personator model.

9. The method as claimed in claim 8, further comprising:
based on determination that the second authentication is failed,
updating the pre-stored personator model based on characteristic information of at least one of the first input voice that succeeds in the first authentication or the second input voice that is input while the function corresponding to the voice recognition is performed.

10. The method as claimed in claim 7, further comprising:
based on determination that the second authentication is failed, terminating the function corresponding to the voice recognition.

11. The method as claimed in claim 7, further comprising:
continuing the performing the function corresponding to the voice recognition based on the second authentication being successful, and performing the second authentication again based on data of additional voice that is input after the second authentication is successful.

12. The method as claimed in claim 7, further comprising:
based on a previous voice input before the function corresponding to the voice recognition is performed corresponding to the specific word, performing the first authentication by comparing data of the first input voice with the pre-stored speaker model and the pre-stored personator model.

13. A non-transitory computer readable medium storing a program, when executed by a processor of an electronic apparatus, causes the electronic apparatus to perform an operation, wherein the operation comprises:
in response to receiving a first input voice corresponding to a specific word, performing a function corresponding to a voice recognition by a first authentication performed based on data of the first input voice, a pre-stored speaker model including characteristic information of a voice of a pre-registered user of the electronic apparatus corresponding to the specific word, and a pre-stored personator model including characteristic information of a voice different from the voice of the pre-registered user; and
performing a second authentication based on data corresponding to the specific word among data of a second input voice that is input while the function corresponding to the voice recognition service is provided, with the speaker model,
wherein the performing the second authentication comprises:
obtaining a phoneme matching of at least one of a plurality of phonemes constituting the specific word among phonemes corresponding to the second input voice that is input while the function corresponding to the voice recognition is performed, determining a first similarity between characteristic information of the first input voice corresponding to the obtained phoneme, and characteristic information of the pre-stored speaker model, determining a second similarity between characteristic information of the obtained phoneme and characteristic information of the pre-stored personator model; and based on a ratio of the determined first similarity to the determined second similarity being greater than a first threshold value, determining that the second authentication is successful, and based on the ratio of the determined first similarity to the determined second similarity being equal to or smaller than the first threshold value, determining that the second authentication in failed.

* * * * *